United States Patent [19]
Liu et al.

[11] Patent Number: 5,508,353
[45] Date of Patent: Apr. 16, 1996

[54] COMB GRAFT POLYMERS AND THEIR USE IN FUNCTIONAL FLUIDS

[75] Inventors: Wan-Li Liu; Frederick C. Loveless, both of Yardley, Pa.

[73] Assignee: Mobil Oil Corporation, Fairfax, Va.

[21] Appl. No.: 285,613

[22] Filed: Aug. 3, 1994

Related U.S. Application Data

[63] Continuation of Ser. No. 221,280, Mar. 31, 1994, abandoned, which is a continuation of Ser. No. 38,307, Mar. 29, 1993, abandoned.

[51] Int. Cl.$^6$ .............................. C08F 257/02; C08F 4/48
[52] U.S. Cl. ........................................ 525/250; 525/271
[58] Field of Search ................................... 525/250, 271, 525/313

[56] References Cited

U.S. PATENT DOCUMENTS

| | | | |
|---|---|---|---|
| 3,318,813 | 5/1967 | McCormick et al. | |
| 3,925,511 | 12/1975 | Loveless. | |
| 3,976,628 | 8/1976 | Halasa et al. | 525/272 |
| 3,989,768 | 11/1976 | Milkovich et al. | 525/292 |
| 4,306,049 | 12/1981 | Prapas | 526/347 |
| 4,503,187 | 3/1985 | Gunesin et al. | 525/240 |
| 4,912,170 | 3/1990 | Niwa et al. | 525/337 |

OTHER PUBLICATIONS

Odian, G. "Principles of Polymerization", N.Y., Wiley, 1991, p. 19.
Y. Minoura et al., "Anionic Graft Copolymerization of Diene Polymers with Vinyl Monomers, "Journal of Polymer Science: Part A–1, vol. 7, 3–14 (1969).

*Primary Examiner*—Vasu S. Jagannathan
*Attorney, Agent, or Firm*—A. J. McKillop; M. D. Keen

[57] ABSTRACT

There are disclosed novel comb graft polymers and copolymers comprising a backbone of a linear polymer of p-methylstyrene (p-MS) and grafted branches of a linear addition polymer of at least one anionically polymerizable compound. The polymers may be produced by metallating the p-MS polymer with an organo alkali metal metallating agent, e.g., an alkyllithium, at active hydrogen sites along the polymer chain and graft polymerizing the anionically polymerizable compound at the metallated sites to form the grafted branches. Certain of the foregoing comb graft polymers and copolymers, e.g., wherein the backbone is a homopolymer of p-MS or a copolymer of p-MS and a ring-substituted alkylstyrene such as p-tert-butylstyrene (t-BS) and the branches are a polymer of t-BS, are useful as additives to functional fluids, particularly hydrocarbon lubricating oils, for the purpose of thickening and improving their viscosity index.

6 Claims, 1 Drawing Sheet

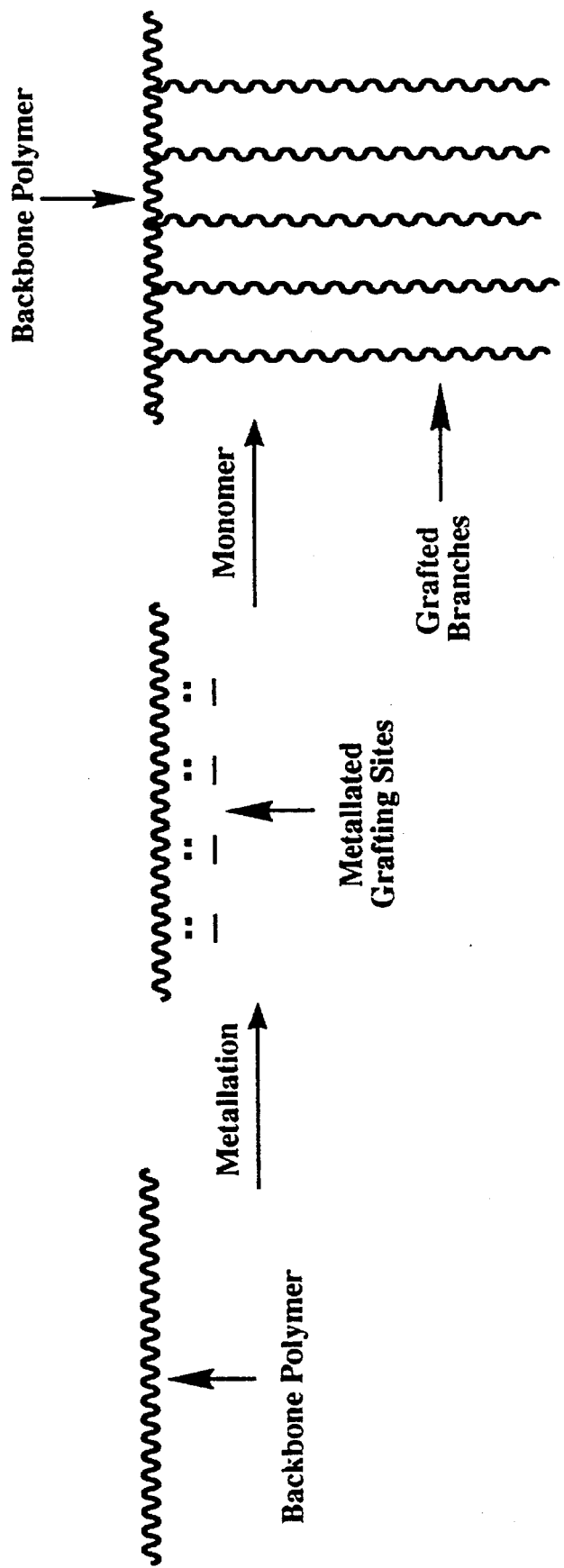

COMB GRAFT POLYMERS AND THEIR USE IN FUNCTIONAL FLUIDS

CROSS REFERENCE TO RELATED APPLICATIONS

This application is a continuation of application Ser. No. 08/221,280, filed Mar. 31, 1994, which is a continuation of application Ser. No. 08/038,307 filed Mar. 29, 1993 both abandoned.

BACKGROUND OF THE INVENTION

Field of the Invention

This invention relates to novel comb graft polymers of p-methylstyrene (p-MS), particularly copolymers of p-MS with any of various comonomers, and the use of such polymers and copolymers as additives for functional fluids, e.g. lubricating oils.

Information Disclosure Statement Including Description of Related Art

Niwa et al., U.S. Pat. No. 4,912,170, disclose the lithiation of polymers of p-methylstyrene with an organic lithium compound, and the reaction of the lithiated polymer with a "delithiuming" compound causing functional substituting groups to form along the polymer chain which are then available for further reaction. There is no suggestion by these patentees of grafting any polymer chains at the lithium, i.e., anionic, sites.

Loveless, U.S. Pat. No. 3,925,511, discloses the metallation of activated hydrogen atoms along the chain of polymers such as polybutadiene or polystyrene, with an organolithium compound and a compound having the formula MOR" wherein M is sodium or potassium and R" is hydrogen or a hydrocarbon radical. The metallated polymer may then be reacted with an anionically polymerizable monomer to form a graft polymer. There is no disclosure by the patentee of graft polymers of a metallated backbone polymer of p-methylstyrene.

McCormick et al., U.S. Pat. No. 3,318,813, disclose polymers of alkylstyrenes, e.g., tert-butylstyrene, as additives for improving the viscosity index of lubricating oils. There is no suggestion in this patent of the use of any graft polymers.

Y. Minoura et al., "Anionic Graft Copolymerization of Diene Polymers with Vinyl Monomers," JOURNAL OF POLYMER SCIENCE: PART A-1, Vol. 7, 3–14 (1969), disclose the preparation of graft copolymers of lithiated polybutadiene or polyisoprene with styrene, methyl methacrylate or acrylonitrile. There is no disclosure in this reference of graft polymers of a lithiated p-methylstyrene polymer.

SUMMARY OF THE INVENTION

In accordance with one aspect of the invention, there are provided novel comb graft polymers and copolymers comprising a backbone of a linear polymer of p-methylstyrene (p-MS) and grafted branches of a linear addition polymer of at least one anionically polymerizable compound, such branches being bonded to the backbone polymer molecule at spaced sites along its length. The comb graft polymers may be produced by metallating the p-MS backbone polymer with an organoalkali metal metallating agent at active hydrogen sites along the polymer chain and graft polymerizing the anionically polymerizable compound at the metallated sites to form the grafted branches.

In accordance with another aspect of the invention, certain of the foregoing comb graft polymers and copolymers, e.g., wherein the backbone is a homopolymer of p-MS or a copolymer of p-MS and a ring-substituted alkylstyrene such as p-tert-butylstyrene (t-BS) and the branches are a polymer of t-BS, are useful as additives to functional fluids, particularly hydrocarbon lubricating oils, for the purpose of improving their viscosity index, relative thickness and/or high temperature high shear rate viscosity.

BRIEF DESCRIPTION OF THE DRAWING

The drawing shows a schematic representation of the preparation of the comb graft polymers of this invention by metallation of the backbone polymer to form metallated grafting sites along the length of the backbone polymer, and the formation of grafted polymer branches at the metallated sites by anionic polymerization.

DETAILED DESCRIPTION OF THE INVENTION

The p-MS polymer which is the backbone of the comb graft polymers in this invention is either a homopolymer of p-MS or a copolymer of p-MS and a compatible polymerizable ethylenically unsaturated compound containing active hydrogen atoms as comonomer, which does not interfere with subsequent metallation. Some contemplated comonomers, for example, are ring-substituted alkylstyrenes wherein the alkyl group is bonded to a ring carbon atom and contains, for example, 2 to 20 carbon atoms, in particular t-BS when the graft copolymer is to be used as an additive for a hydrocarbon functional fluid. Conjugated dienes may be used as comonomers to form the backbone and are used in quantities to insure the solubility of the poly-metallated backbone or spine prior to the grafting step. Suitable conjugated dienes are isoprene, 1,3-butadiene, and 2,3-dimethyl-1,3-butadiene. The p-MS may be present in the backbone polymer in an amount of at least about 1 wt. % . , e.g. about 1 to 50 wt. %, preferably at least about 10 wt. %, e.g. about 10 to 50 wt. %. A particularly preferred backbone polymer when the final polymer is used as a V.I. improver for hydrocarbon functional fluids is a copolymer of from about 10 to 20 wt. % of p-MS with the remainder being t-BS.

The backbone polymer may be prepared by conventional means, such as anion solution or suspension polymerization and free radical solution, suspension, or emulsion polymerization. Anionic polymerization is the preferred method. The backbone polymer may have a weight average molecular weight (Mw), for example, of about 10,000 to 250,000, preferably about 50,000 to 100,000, a number average molecular weight (Mn) of about 10,000 to 250,000, preferably about 50,000 to 100,000, and a molecular weight distribution (MWD, Mw/Mn) of about 1.01 to 5.00, as determined by gel permeation chromatography (GPC). Preferably, the MWD of the backbone polymer is close to 1.0.

The next step in the preparation of the comb graft polymers of this invention is the metallation of the backbone polymer. This is accomplished by contacting the backbone polymer with a suitably organo alkali metal metallating agent, e.g. an organolithium compound such as an alkyllithium containing, for example 1 to 10 carbon atoms, and preferably tert-butyllithium or sec.-butyllithium. Organosodium and organopotassium compounds may also be used for this purpose.

In a less preferred method, particularly when using n-butyllithium, the metallation reaction may be facilitated by utilizing such agent in the presence of a tertiary amine, e.g. N,N,N'N'-tetramethylethylenediamine (TMEDA). Such tertiary amine may be employed in an amount, for example, of about 1 to 4 moles per mole of organolithium compound.

The metallation is accomplished by contacting the polymer with the metallating agent in solution in an inert organic solvent, which may be a saturated aliphatic solvent or benzene. Sufficient metallating agent is used to provide an average number of metallated sites per molecule of backbone polymer of, for example, about 2 to 100, preferably about 5 to 30.

The reaction time and temperature for the metallation are not critical and may vary widely, for example from ½ to 50 hours, preferably 1 to 30 hours, frequently about 18 hours, at from 0° C. to 100° C., preferably from 18° C. to 60° C., frequently about 50° C. Ordinarily the time and temperature are roughly inversely related. The organo alkali metal compound may be present, for example, in an amount from 0.1 to 200 moles, preferably from 1.0 to 100 moles, per mole of polymer. The mixture is agitated during the metallation, which is frequently accompanied by the formation of a deep red color from the anions produced.

Particularly suitable polymetallated backbone polymers because of their improved solubility in various solvents, e.g., n-pentane, are polymetallated copolymers of p-MS and at least 50 wt. % t-BS, preferably about 1 to 50 wt. % of p-MS and 50 to 99 wt. % of t-BS, more preferably about 10 to 50 wt. % of p-MS and 50 to 90 wt. % of t-BS, and most preferably about 10 to 20 wt. % of p-MS and 80 to 90 wt. % of t-BS.

To form a graft polymer, an anionically polymerizable monomer is added to the solution of metallated polymer. (As is well understood by those skilled in the art, any monomer which has a group which is capable of withdrawing electrons attached to an ethylenic double bond is anionically polymerizable). Such monomers include vinyl aryl compounds, such as ring substituted alkylstyrenes, e.g., t-BS, other substituted styrenes such as alpha-methylstyrene, or styrene; and conjugated dienes, e.g., butadiene, isoprene or piperylene. Mixtures of monomers may be used, in which case the grafted branches will be in the form of random copolymers of the monomers subjected to the polymerization reaction. It is also possible to prepare a comb graft polymer in which the grafted branches are in the form of block copolymers of more than monomer by adding more than one anionically polymerizable monomer sequentially to the metallated backbone polymer, following procedures which are well known in the art.

When the comb graft polymer is intended as a V.I. improver for hydrocarbon functional fluids, then the grafted branches are each preferably a hydrocarbon polymer, particularly a homopolymer of t-BS or a copolymer of a major amount, e.g., at least 50 wt. % of t-BS with another hydrocarbon monomer such as those suitable for the formation of the original backbone polymer, or a homopolymer of a conjugated diene, preferably isoprene. When the grafted monomer is a conjugated diene, it is necessary to hydrogenate the formed comb graft polymer to produce an oxidatively stable polymer for use as a V.I. improver.

The graft polymerization reaction will proceed at ordinary ambient temperature, e.g. 21° C. Preferably, however, the solution of backbone polymer and monomer to be graft polymerized is heated somewhat, e.g. up to 50°–100° C., to speed up the graft polymerization reaction. Depending on the temperature, the graft polymerization may be completed, for example, within a period of about 4 to 24 hours.

The resulting grafted polymer may be isolated by conventional methods, for example by pouring the solution into a precipitant (e.g. isopropanol). Generally the solution of grafted polymer in the reaction vessel is short-stopped by addition of a proton donor such as an alcohol or carboxylic acid, and an antioxidant is added prior to precipitation or exposure to atmospheric conditions.

Depending on the metallation and graft polymerization conditions, the comb graft polymer may contain an average of about 2 to 100, preferably substantially about 5 to 30 grafted branches per molecule (substantially equal to the average number of metallated sites per molecule of a backbone polymer), and the branches may have a weight average molecular weight (Mw) of about 1,000 to 1,000,000, preferably about 5,000 to 50,000, and a number average molecular weight (Mn) of about 1,000 to 1,000,000, preferably about 5,000 to 50,000, all estimated by GPC. The total molecular weight of the polymer is the sum of the molecular weights of the backbone polymer and grafted branches and may be in the range (Mw) of about 10,000 to 10,000,000, preferably about 500,000 to 1,000,000, and in the range (Mn) of about 10,000 to 10,000,000, preferably about 500,000 to 1,000,000.

The process of this invention including the steps of metallating the backbone polymer and grafting polymer branches at the metallated sites as well as the structure of the final comb graft polymer, are depicted schematically in the drawing.

Many of the comb graft polymers of this invention are particularly useful as additives to functional fluids such as lubricating oils and greases, brake fluids, transmission fluids and hydraulic fluids, for the purpose of increasing their relative thickness and raising their viscosity index (V.I.).

Advantageously, the comb graft polymer, particularly when it is a hydrocarbon, may be incorporated in a lubricating medium comprising a base liquid hydrocarbon oil in the form of either a mineral oil or a synthetic oil, or in the form of a grease in which any of the aforementioned oils are employed as a vehicle. In general, base mineral or synthetic oils employed as the lubricant, or grease vehicle, may be of any suitable lubricating viscosity range, as, for example, from about 2 to about 100 centistokes (cs) and, preferably from about 4 to about 10 cs at 100° C.

These oils may have viscosity indexes ranging, for example, from about 70 to about 100 using mineral oil base stocks and from about 100 to 200 using synthetic base stocks. The average molecular weights of these oils may range from about 250 to about 2,000. Where the lubricant is to be employed in the form of a grease, the lubricating oil is generally employed in an amount sufficient to balance the total grease composition, after accounting for the desired quantity of the thickening agent, and other additive components to be included in the grease formulation.

In instances where synthetic oils, or synthetic oils employed as the vehicle for the grease, are desired in preference to mineral oils or in combination therewith, various compounds of this type may be successfully utilized. Typical synthetic vehicles include poly(alpha-olefins) (PAO's) such as polybutenes, polyhexenes, and polydecenes, polypropylene glycol, esters such as trimethylol propane esters, neopentylglycol esters, pentaerythritol esters, sebacates, adipates, and phthlalates, alkylated diphenyl ethers and alkylated aromatics.

When used as an additive for functional fluids such as lubricating oils, a minor proportion of the comb graft polymer of this invention may be present in the base stock oil, e.g., in an amount of about 0.1 to 20 wt. %, preferably about 0.5 to 5 wt. %. In general, the blending of the base stock oil with a comb graft polymer of this invention has the effect of raising the viscosity index (VI) by an increment in the range of about 50 to 150 such that the final oil blend has a VI in the range, for example, of about 150 to 350, preferably about 175 to 250, (the VI being determined by the method of ASTM D2270) using kinematic viscosities in centistokes (cs.) determined at 40° C. and 100° C. The foregoing ranges of viscosity index correspond to kinematic viscosities of the polymer-containing functional fluid of about 50 to 2,000 cs. at 40° C. and about 8 to 100 cs. at 100° C. Moreover, certain of the comb graft polymers of this invention have a relative thickening power (RTP) of for example about 2 to 100, preferably about 10 to 20, where RTP is a measure of the thickening efficiency of the polymer relative to PAO-100, a hydrogenated poly(decene-1) having a kinematic viscosity at 100° C. ($KV_{100}$) of 100 cs. Thus, the amount of PAO-100 required to thicken the base oil to the same viscosity as the blend containing the polymer is calculated by means of the following equation:

$$\log KV_{100} \text{ (blend)} = x/100 [1 - \log KV_{100} \text{ of base oil}] + \log KV_{100} \text{ of base oil}$$

where x is the percentage of PAO-100 required to achieve the blend viscosity. The RTP of the polymer is then determined by the equation:

RTP=x/(weight percent of polymer in blend)

In addition to their use as additives for functional fluids, the comb graft copolymers of this invention are also useful in plastic compositions, particularly as high impact modifiers or polymeric compatabilizers, or as elastomers, particularly thermoplastic elastomers.

In addition to the comb graft polymers containing grafted branches as disclosed previously, the polymer may be an elastomer wherein the grafted branches are block or random copolymers of at least two different conjugated dienes similar to the branches of the star-branched copolymers, described in U.S. Pat. No. 5,187,236, issued Feb. 16, 1993 to Coolbaugh et al., the entire disclosure of which is incorporated herein by reference. When the grafted branches are block copolymers, they contain at least two alternating blocks I-B, or A-D, with I or A occupying the free end of each branch, and wherein block I is a polymer of at least one hydrocarbon conjugated diene monomer containing at least five carbon atoms, with at least one carbon atom of each pair of residual double bonded carbon atoms of said polymerized conjugated diene units being additionally single bonded to two carbon atoms, e.g., isoprene, block A is a copolymer of at least one hydrocarbon conjugated diene of the type used to prepare block I and an aryl-substituted olefin, e.g., styrene, and blocks B and D are polymers of at least one hydrocarbon conjugated diene different from that used to prepared blocks I and A and having at least four carbon atoms, with each residual double bonded carbon atom of the polymerized conjugated diene being additionally bonded to a hydrogen atom, e.g., butadiene. Alternatively the grafted branches may each be a random polymer of at least one of each of the two different types of conjugated dienes previously described and wherein the copolymer comprises about 1.0 to about 25% by mole of said first-described diene, e.g., isoprene, and about 75 to about 99% by mole of said second-described diene, e.g., butadiene.

When the comb graft copolymer containing as grafted branches any of the block or random copolymers of at least two conjugated dienes as previously described, are selectively hydrogenated as taught in previously cited U.S. Pat. No. 5,187,236, or in Falk "Coordination Catalysts for the Selective Hydrogenation of Polymeric Unsaturation," JOURNAL OF POLYMER SCIENCE: PART A-1, Vol. 9, 2617–2623, e.g., using any of the catalysts disclosed in the cited application, the residual double bonds of the polymerized second described diene, e.g., butadiene tend to become substantially completely hydrogenated while many of those of the polymerized first described diene, e.g., isoprene, tend to remain intact. The result is a comb graft copolymer containing residual double bonds concentrated at the free ends of the grafted branches when the latter are block copolymers or at widely spaced points along the polymer chain when the grafted branches are random copolymers. In either case, the double bonds provide the sites for vulcanization resulting in relatively few and widely separated cross-links accompanied by a high degree of network perfection. This in turn results in a polymer having excellent mechanical and elastomeric properties and, at the same time, a high degree of stability in the presence of ozone and oxygen because of its relatively low content of residual unsaturation.

The remaining residual double bonds of the foregoing selectively hydrogenated comb graft copolymers may also be utilized as the sites for various chemical modifications, e.g., sulfonation, maleation or halogenation, in accordance with procedures well known in the art, for the purpose of altering the properties of the polymers so that they are more suitable for certain end uses.

The invention may be illustrated by the following examples.

Examples 1 to 3 describe the preparation of comb graft copolymers wherein the backbone polymer is a random copolymer of 20 wt. % of p-MS and 80 wt. % of t-BS and the grafted branches are linear homopolymers of t-BS. In Examples 4–13, the backbone polymer and/or the grafted branches are different from those of Examples 1–3, as described in each example.

EXAMPLE 1

To a 650 ml polymerization bottle were charged 16g of p-methylstyrene (p-MS), 64g of p-tert-butylstyrene (t-BS), 0.13 ml of 2,2'-dipyridyl solution (0.1M in cyclohexane) and 467 ml of cyclohexane. The p-MS and t-BS had both been previously dried and purified by passing them through aluminum oxide columns. The mixture was stirred and dry nitrogen was bubbled through it for 30 min. A solution of sec-butyllithium initiator (1.3 M in cyclohexane) was used to titrate the mixture to orange color (endpoint for dryness). Anionic polymerization was then initiated by adding 1.03 ml of the 1.3 M solution of sec-butyllithium. The polymerization was continued for 16h at room temperature after which it was terminated by injecting a small amount of dry isopropanol. The polymer solution was then poured into 1,000 ml of isopropanol to precipitate the polymer which was then filtered and dried overnight in a vacuum oven at 50° C. The weight average molecular weight (Mw) of the backbone polymer was $7.71 \times 10^4$, the number average molecular weight (Mn) was $6.21 \times 10^4$ and the molecular weight distribution (MWD = Mw/Mn) was 1.15. This was the basic backbone polymer used for metallation, which was carried out as follows.

To a 650 ml polymerization bottle were charged 4.96g (0.08 mmole) of the foregoing backbone polymer, 0.125 ml of 2,2'-dipyridyl solution (0.1 M in cyclohexane), and 400 ml. of cyclohexane. The bottle was sealed and dry nitrogen was bubbled through the mixture for 30 min. A solution of tert-butyllithium agent (1.7 M in cyclohexane) was used to titrate the mixture to yellow color (endpoint for dryness) and 0.47 ml of the 1.7 M tert-butyllithium solution (0.8 mmole) was then injected into the bottle, which is calculated to provide an average of about 10 metallated sites per molecule of the backbone polymer. The metallation was carried out by stirring the contents of the bottle immersed in an oil bath at 60° C. for 19h.

Branches of a linear homopolymer of t-BS were grafted onto the foregoing metallated backbone polymer as follows:

To a 500 ml pre-dried flask were charged 90.5 ml (80g) of t-BS (purified by passing it through aluminum oxide and 3A molecular sieve columns to remove moisture), 60 ml of cyclohexane, and 0.1 ml of 2,2'-dipyridyl solution (0.1M in cyclohexane). The amount of t-BS was calculated to yield grafted branches of t-BS homopolymer having an average Mn per branch of about 100,000 at each metallated site on the backbone polymer. A small amount of n-butyllithium was used to titrate the solution to yellow color. The solution was then transferred to the polymerization bottle containing the metallated backbone polymer prepared as described previously. The bottle was inserted into an oil bath at 60° C. to initiate graft polymerization which was continued for 24h. A small amount of dry isopropanol was then injected into the battle to terminate the living anions, after which the polymer solution was poured into 2000 ml of isopropanol to precipitate the polymer which was filtered and dried overnight in a vacuum oven at 50° C. The molecular weight characteristics of the final comb graft copolymer were as follows: Mw=1.04×$10^6$; Mn=8.24×$10^5$; and MWD=1.26. The molecular weights were determined by gel permeation chromatography (GPL). The grafting efficiency is 97.1% as determined by the following calculations.

Backbone polymer (p-MS-co-t-BS)=4.96/62,100=0.08 mmole.

Branched polymer (poly t-BS) at 10/1 ratio=0.8 mmole.

The grafting efficiency is determined using the following equation:

$$\text{Measured Mn of total polymer} = \frac{\text{moles of grafted polymer} \times \text{Mn of grafted polymer} + \text{moles of ungrafted polymer} \times \text{Mn of ungrafted polymer}}{\text{total moles of grafted and ungrafted polymer}}$$

Substituting the values of this example yields the following equation based on one mole of comb graft polymer, where y is the portion of the theoretical 10 moles of grafted poly-t-BS of 100,000 Mn each which is actually grafted onto the backbone polymer and [10-y] is the portion which remains ungrafted.

$$824,000 = \frac{1[62,100 + y(100,000)] + [10 - y)(100,000)]}{1 + 10 - y}$$

9,064,000−824,000y=62,100+1,000,000 y=9.71

Grafting Efficiency=(9.71/10)×100%=97.1%

The comb graft polymer of this example was tested as an improver of viscosity index (VI) and thickening power of a synthetic lubricating oil base stock which was a polymerized alpha-olefin (PAO-4), more specifically a hydrogenated polymer of decene-1 having kinematic viscosities at 40° C. ($KV_{40}$) of 17.5 centistokes (cs.) and at 100° C. ($KV_{100}$) of 4 cs. and a viscosity index (VI) of 128 (ASTM D2270). When the comb graft copolymer was blended with this lubricating oil base stock in an amount of 5 wt. %, the properties of the resulting oil were as follows: $KV_{40}$=184 cs.; $KV_{100}$=37.2 cs.; VI=252 and relative thickening power (RTP)= 13.9.

EXAMPLE 2

The procedure of Example 1 was generally followed except that the metallated polymer had a Mw of 4.53×$10^4$ a Mn of 4.02×$10^4$ and a MWD of 1.13 and the quantity of t-BS added in the grafting step was calculated to provide t-BS homopolymer grafted branches having a theoretical average molecular weight per branch of 100,000. A grafting efficiency of 100% was achieved. The PAO-4 base oil blended with 5 wt. % of the polymer had the following properties: $KV_{40}$=788 cs.; $KV_{100}$=155 cs.; VI=301; and RTP=22.7.

EXAMPLE 3

The procedure of Example 1 was generally followed except that the metallated backbone polymer had a Mw of 1.38×$10^4$, a Mn of 1.25×$10^4$, and a MWD of 1.10; and sufficient t-BS monomer was present in the grafting step to provide grafted branches having an average Mn per branch of about 100,000. As measured by GPC, the comb graft polymer had an Mw of 1.00×$10^6$, a Mn of 5.01×$10^5$ and a MWD of 2.00, equivalent to 89.8% grafting efficiency. A 5.00 wt % blend of the polymer in PAO-4 had a $KV_{40}$ of 245 cs., a $KV_{100}$ of 48.8 cs., a VI of 260, and a RTP of 15.6.

EXAMPLE 4

The procedure of Example 1 using the backbone polymer of Example 2 was generally followed except that quantities of t-BS and p-MS were added in the grafting step calculated to provide an average of ten grafted branches per molecule of a copolymer of 80 wt. % of t-BS and 20 wt. % of p-MS having an average Mn per branch of 40,000. The actual molecular weight characteristics of the comb graft polymer as determined by GPC were: Mw=3.03×$10^5$; Mn=2.58×$10^5$; and MWD=1.18. The grafting efficiency was 93%.

EXAMPLE 5

The procedure of Example 1 utilizing an average of 10 metallated grafting sites per molecule of backbone polymer, was generally followed except that the backbone polymer had a Mw of 3.31×$10^4$, a Mn of 3.17×$10^4$ and a MWD of 1.04; and the grafted branches were homopolymers of isoprene, with enough isoprene being supplied to the grafting reaction to provide an average Mn per branch of about 40,000. As determined by GPC, the comb graft copolymer had a Mw of 4.88×$10^5$, a Mn of 3.33×$10^5$, and a MWD of 1.46. After hydrogenation with an Al/Co catalyst, the final comb graft copolymer had a Mw of 4.57×10, a Mn of 3.12×$10^5$ and a MWD of 1.46. A 5 wt. % solution of the polymer in PAO-4 had a $KV_{40}$ of 170 cs., a $KV_{100}$ of 35 cs., a VI of 246 and a RTP of 13.5.

EXAMPLES 6 TO 8

These examples illustrate the formation of comb graft polymers containing a backbone of a homopolymer of p-MS, an average of 10 metallated grafting sites per molecule of backbone polymer, and grafted branches of a homopolymer of p-MS (Example 6), styrene (Example 7) and isoprene (Example 8).

In forming the polymers, the procedure of Example 1 was generally followed except that p-MS was the only monomer used in the formation of the backbone polymer, the polymerizations were terminated by isopropanol diluted by cyclohexane before use, the metallation of the p-MS homopolymer backbone was carried out at 60° C. for 17h, the amount of tert-butyllithium present in the metallation step was sufficient to provide an average of 10 metallated grafting sites per molecule of backbone polymer, the graft polymerization step was carried out at 60° C. for 24 h with enough of each monomer supplied to provide grafted branches having a nominal average Mn each of about 50,000.

The backbone p-MS homopolymer was the same in each of the examples and had molecular weight characteristics measured by GPC as follows: Mw=$3.31 \times 10^4$; Mn=$3.14 \times 10^4$; and MWD=1.04. The actual molecular weight values of the final comb graft copolymers as measured by GPC are shown in Table I. These values indicate a grafting efficiency for each polymer of greater than 97%.

TABLE I

| Example | Mw | Mn | MWD |
| --- | --- | --- | --- |
| 6 | $1.25 \times 10^6$ | $5.93 \times 10^5$ | 1.71 |
| 7 | $8.61 \times 10^5$ | $4.80 \times 10^5$ | 1.79 |
| 8 | $4.97 \times 10^5$ | $3.95 \times 10^5$ | 1.26 |

EXAMPLES 9 TO 12

These examples show the formation of comb graft polymers similar to those of Examples 6–8 except that the grafted branches were in some cases composed of different polymers. Thus, the procedure of examples 6–8 was generally followed in preparing a p-MS homopolymer containing an average of 10 metallated grafting sites per molecule of backbone polymer. However, the grafting monomers utilized were p-MS (Example 9), butadiene (Example 10), 80 wt. % of isoprene and 20 wt. % of styrene added sequentially to yield a block copolymer (Example 11) and 20 wt. % of isoprene and 80 wt. % of styrene added sequentially to yield a block copolymer (Example 12). Moreover, the amount of grafting monomer supplied was sufficient to provide grafted branches having a nominal average Mn each of about 50,000 in Examples 9, 11 and 12 and 30,000 in Example 10. Finally, the solvent for the graft polymerization step was n-hexane rather than cyclohexane as in the other examples.

The same backbone p-MS homopolymer was used in each of these examples and had a Mw of $4.32 \times 10^4$; a Mn of $4.27 \times 10^4$ and a MWD of 1.01 as measured by GPC. The molecular weight values of the final comb graft polymers obtained in these examples are shown in Table II.

TABLE II

| Example | Mw | Mn | MWD |
| --- | --- | --- | --- |
| 9 | $1.19 \times 10^6$ | $6.90 \times 10^5$ | 1.79 |
| 10 | $8.10 \times 10^5$ | $5.23 \times 10^5$ | 1.55 |
| 11 | $1.28 \times 10^6$ | $7.48 \times 10^5$ | 1.71 |
| 12 | $8.40 \times 10^5$ | $5.80 \times 10^5$ | 1.44 |

The comb graft polymers of Examples 6–12 in general have utilities similar to those of linear polymers having the same structure as the grafted branches of the comb graft polymer. Thus, for instance, the polymers of Examples 8 and 10 have uses similar to those of polyisoprene and polybutadiene rubbers; that of Example 11 may be used for the same purpose as a compatible impact modifier for relatively brittle resins such as polystyrene; and that of Example 12 may be used in applications similar to those of conventional high impact polystyrene. However, because of their much higher molecular weights than those of conventional linear polymers, the comb graft polymers of this invention should contribute superior mechanical properties to the compositions containing them.

EXAMPLE 13

This example illustrates the preparation of a comb graft polymer which may be selectively hydrogenated similar to the star branched polymers described in previously cited U.S. Pat. No. 5,187,236 to yield a polymer which can be vulcanized to obtain a product having excellent mechanical and elastomeric properties and a high degree of stability in the presence of ozone and oxygen.

The procedure of Example 10 was generally followed except that, instead of all butadiene, the grafting monomers were 91 wt. % of butadiene and 9 wt. % of isoprene added sequentially, so that the final comb graft copolymer contained an average of about 10 grafted branches per molecule of a block copolymer of butadiene and isoprene. After the polymerization of butadiene and isoprene, the polymer had a Mw of $1.07 \times 10^6$, a Mn of $4.82 \times 10^5$, and a MWD of 2.22.

The comb graft copolymer of this example could be selectively hydrogenated as disclosed in previously cited U.S. Pat. No. 5,187,236 so that all or most of the residual unsaturation in the polybutadiene blocks are hydrogenated while some of the residual unsaturation in the polyisoprene blocks remains unhydrogenated. The selectively hydrogenated comb graft copolymer may then be vulcanized utilizing the remaining residual unsaturation in the polyisoprene block to yield a polymer having excellent mechanical and elastomeric properties, and, because of the substantial saturation of the polybutadiene blocks, exceptionally high resistance to ozone and oxygen degradation. Thus, comb graft copolymers of the type illustrated by this example, i.e., having grafted branches which are block or random copolymers of at least two different conjugated dienes, e.g., butadiene and isoprene, the polymers of which have different susceptibilities to hydrogenation, may be used for the same purposes as the linear and star branched copolymers disclosed in previously cited U.S. Pat. No. 5,187,236.

EXAMPLE 14

The procedure of Example 1 was generally followed except that the metallated backbone polymer was carried out in n-pentane solution at high concentration. After completing the metallation, the metallated backbone polymer was completely soluble in n-pentane solution and could be used to graft different monomers, such as butadiene, isoprene, styrene, p-methylstyrene, t-butylstyrene, or mixtures of them, to form comb graft polymers with high grafting efficiency.

We claim:

1. A process for the preparation of comb graft polymers comprising metallating a linear copolymer of about 10 to 50 wt. % of para-methylstyrene (p-MS), and about 50 to 90 wt. % of p-tert-butylstyrene (t-BS) having a weight average molecular weight (Mw) of about 10,000 to 250,000 and a molecular weight distribution (Mw/Mn) of about 1.01 to 5.00, said metallation being carried out by contacting said copolymer of p-MS with an organo alkali metal metallating agent which reacts with active hydrogen in the polymerized p-MS units to form a backbone polymer containing metallated sites, sufficient metallating agent being present to form an average of about 2 to 100 metallated sites per molecule along the chain of the backbone polymer, and contacting said metallated backbone polymer with t-BS to form grafted branches of a homopolymer of t-BS in a graft polymerization reaction originating at said metallated sites, the supply of t-BS and the period of time of said graft polymerization being sufficient to form a comb graft polymer having a Mw of about 10,000 to 10,000,000 and a Mn of about 10,000 to 10,000,000.

2. The process of claim 1 wherein said metallating agent is an organolithium compound.

3. The process of claim 2 wherein said organolithium compound is an alkyllithium containing 1 to 10 carbon atoms.

4. The process of claim 3 wherein said organolithium compound is tert-butyllithium or sec-butyllithium.

5. The process of claim 1 wherein said linear polymer of p-MS is a copolymer of about 10 to 20 wt. % of p-MS and about 80 to 90 wt. % of t-BS.

6. The process of claim 5 wherein said linear polymer of p-MS is a copolymer of about 20 wt. % of p-MS and 80 wt. % of t-BS.

* * * * *